US012063442B2

(12) United States Patent
Chik et al.

(10) Patent No.: US 12,063,442 B2
(45) Date of Patent: Aug. 13, 2024

(54) OPTIMIZED PATH PLANNING FOR DEFECT INSPECTION BASED ON EFFECTIVE REGION COVERAGE

(71) Applicant: Hong Kong Applied Science and Technology Research Institute Company Limited, Hong Kong (CN)

(72) Inventors: Tai Wai David Chik, Hong Kong (CN); Chi Shing Wong, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 144 days.

(21) Appl. No.: 17/816,778

(22) Filed: Aug. 2, 2022

(65) Prior Publication Data

US 2024/0048848 A1 Feb. 8, 2024

(51) Int. Cl.
*H04N 23/695* (2023.01)
*G01N 21/88* (2006.01)
(Continued)

(52) U.S. Cl.
CPC ....... *H04N 23/695* (2023.01); *G01N 21/8851* (2013.01); *G01N 21/9515* (2013.01);
(Continued)

(58) Field of Classification Search
None
See application file for complete search history.

(56) References Cited

U.S. PATENT DOCUMENTS 5,684,259 A * 11/1997 Horii ............... G10H 1/0008
84/626
8,059,151 B2 11/2011 Ersue et al.
(Continued)

FOREIGN PATENT DOCUMENTS

CN 113343355 A 9/2021
CN 114113114 A 3/2022
(Continued)

OTHER PUBLICATIONS

E. Glorieuxa, P. Franciosa and D. Ceglarek, "Coverage Path Planning with Targeted Viewpoint Sampling for Robotic Free-Form Surface Inspection," Robotics and Computer-Integrated Manufacturing, vol. 61, Feb. 2020, 101843.
(Continued)

*Primary Examiner* — Eileen M Adams
(74) *Attorney, Agent, or Firm* — S&F/WEHRW (57) ABSTRACT

A movable camera travels along an inspection path for optically inspecting an inspection surface of an object for defect detection. In planning the inspection path, a set of viewpoints on the inspection surface is generated. Each viewpoint is associated with a patch, which is a largest area of the inspection surface within a field of view (FOV) of the camera when the camera is located over the viewpoint for capturing an image of FOV. An effective region of the patch is advantageously predicted by a neural network according to a three-dimensional geometric characterization of the patch such that the predicted effective region is valid for defect detection based on the captured image. A valid area is one whose corresponding area on the captured image is not blurred and is neither underexposed nor overexposed. The inspection path is determined according to respective effective regions associated with the set of viewpoints.

19 Claims, 8 Drawing Sheets

(51) Int. Cl.
*G01N 21/95* (2006.01)
*G06T 7/73* (2017.01)

(52) U.S. Cl.
CPC ........ *G06T 7/75* (2017.01); *G01N 2021/8887* (2013.01); *G01N 2201/1296* (2013.01)

(56) References Cited

U.S. PATENT DOCUMENTS

| | | |
|---|---|---|
| 2009/0174767 A1 | 7/2009 | Kishimoto et al. |
| 2018/0357262 A1* | 12/2018 | He .................... G06F 16/285 |
| 2019/0318469 A1* | 10/2019 | Wang .................... G06N 3/08 |
| 2019/0371053 A1* | 12/2019 | Engholm ................ G06T 17/10 |
| 2021/0398271 A1 | 12/2021 | Lee |
| 2022/0035489 A1* | 2/2022 | Gilboa-Solomon ... G16H 30/40 |
| 2022/0187076 A1* | 6/2022 | Gonzalez Diaz ....... G06F 30/10 |
| 2023/0289984 A1* | 9/2023 | Reaungamornrat ...... G06T 7/11 |

FOREIGN PATENT DOCUMENTS

| | | |
|---|---|---|
| CN | 114494250 A | 5/2022 |
| WO | 02069062 A2 | 9/2002 |
| WO | 2022031644 A1 | 2/2022 |

OTHER PUBLICATIONS

W. R. Scott, G. Roth and J.-F. Rivest, "View Planning for Automated Three-Dimensional Object Reconstruction and Inspection," ACM Computing Surveys, vol. 35, No. 1, Mar. 2003, pp. 64-96.

* cited by examiner

OPTIMIZED PATH PLANNING FOR DEFECT INSPECTION BASED ON EFFECTIVE REGION COVERAGE

LIST OF ABBREVIATIONS

2D Two-dimensional
3D Three-dimensional
AutoML Automated machine learning
DNN Deep neural network
FOV Field of view
NN Neural network

FIELD OF THE INVENTION

The present invention generally relates to using a movable camera to image an inspection surface of an object for defect detection. Particularly, the present invention relates to a computer-implemented method for planning an inspection path for the movable camera to travel along so as to optically inspect the inspection surface for defect detection.

BACKGROUND

Surface inspection is an important and necessary procedure in manufacturing and maintenance in that it is related to quality control and even safety of a product. For instance, surface inspection is useful for identifying cracks on a train rail or an airplane, etc.

Conventionally, an inspection process involves human eyes in making judgement so that poor reliability is an issue. To ensure uniformity in the inspection, automated or robotic inspection systems have been developed to resolve this issue, together with the advantages of increasing efficiency and productivity of the inspection process. One problem associated with the inspection process is that a camera or an imaging sensor can only cover a portion of an inspected object from a particular viewpoint, so that planning of a path traversed by the camera or the imaging sensor is required. Methods for path planning have been developed in the art, e.g.: E. GLORIEUXA, P. FRANCIOSA and D. CEGLAREK, "Coverage Path Planning with Targeted Viewpoint Sampling for Robotic Free-Form Surface Inspection," *Robotics and Computer-Integrated Manufacturing*, vol. 61, February 2020, 101843; W. R. SCOTT, G. ROTH and J.-F. RIVEST, "View Planning for Automated Three-Dimensional Object Reconstruction and Inspection," *ACM Computing Surveys*, vol. 35, no. 1, March 2003, pp. 64-96; U.S. Pat. No. 8,059,151 B2; and CN 113343355A.

Existing path-planning methods are mainly focused on provision of full coverage of an inspection surface of the inspected object, and largely ignore the impact of different optical properties of the surface to the inspection process. The inspection surface may be reflective, semi-transparent, etc. It leads to an invalid inspection process if the camera is disadvantageously positioned such that strong reflected light or unwanted glare is received by the camera. In some situations, even though the surface of an object has been inspected with images captured, the surface is not properly inspected due to poor image quality. Hence, the inspection process is incomplete and the results obtained from the inspection process are not reliable.

It is desirable that the inspection process completely covers the whole surface of the inspected object and that all captured images of the object are valid for being processed by a machine-vision inspection algorithm. There is a need in the art for a technique of planning an inspection path traversed by the camera such that the entire inspection surface is covered while avoiding visiting disadvantageous positions that yield invalid captured images.

SUMMARY OF THE INVENTION

A first aspect of the present invention is to provide a computer-implemented method for planning an inspection path on an inspection surface of an object. The inspection path is used for guiding a movable camera to travel along for optically inspecting the inspection surface for defect detection.

In the method, a set of viewpoints on the inspection surface is generated. An individual viewpoint is associated with a patch, where the patch is a largest area of the inspection surface within a FOV of the camera when the camera is located over the individual viewpoint for capturing an image of the FOV. Advantageously an effective region of the patch is predicted by a NN according to a 3D geometric characterization of the patch such that the predicted effective region is valid for defect detection based on the captured image associated with the individual viewpoint. The NN predicts the effective region after the NN is trained. The inspection path is determined according to a plurality of respective effective regions associated with the set of viewpoints.

Preferably, the determining of the inspection path according to the plurality of respective effective regions of patches associated with the set of viewpoints comprises the following first and second steps. In the first step, an optimized subset in the set of viewpoints is determined such that the determined optimized subset is a smallest non-empty subset in the set of viewpoints under a constraint that a union of respective effective regions of patches associated with different survived viewpoints in the optimized subset covers the entire inspection area. The optimized subset forms a set of survived viewpoints. In the second step, the inspection path is determined as an optimized path joining all respective survived viewpoints and visiting each of the respective survived viewpoints once with a minimal travel cost for the camera to travel among all possible paths each of which joins all the respective survived viewpoints and visits each of the respective survived viewpoints once.

The optimized subset may be determined according to a solution to the Set Cover Problem.

The optimized path may be determined according to a solution to the Open Loop Travelling Salesman Problem.

Preferably, the 3D geometric characterization is given by a plurality of 3D-point data comprising 3D coordinates of constituent points of a point cloud that models the patch.

It is also preferable that the predicting of the effective region of the patch by the NN comprises determining whether an individual constituent point of the patch is inside or outside the effective region. It thereby allows the effective region to be represented by the point cloud that models the patch with an indication for the individual constituent point whether the individual constituent point is inside or outside the effective region.

In the method, preferably a CAD model of the object is obtained. The CAD model comprises at least design data that geometrically model the inspection surface. As a result, the set of viewpoints is generated according to the CAD model. It is also preferable that after the effective region is predicted, the effective region associated with an individual survived viewpoint is projected onto the CAD model.

In certain embodiments, the NN is a DNN.

In certain embodiments, the NN is selected from PointNet++ and ConvPoint.

In certain embodiments, the NN is generated by an AutoML tool.

In the method, the NN may be trained with a training dataset. The training dataset may comprise a plurality of training samples. An individual training sample may comprise a patch-for-training and a ground-truth effective region.

In certain embodiments, the method further comprises preparing the training dataset.

The preparing of the training dataset comprises taking the following actions. First, receive first and second test images of the patch-for-training. The first and second test images are captured by the camera located at a same position over the patch-for-training under a white illumination condition and under a bright/dark strip illumination condition, respectively, in illuminating the patch-for-training. Second, identify a patch-on-image on the first test image. The patch-on-image is the patch-for-training appeared on the first test image. Third, identify a first portion of the patch-on-image that is excessively bright or excessively dark according to the first test image. Fourth, identify a second portion of the patch-on-image that is out of focus according to the second test image. Fifth, remove the first and second portions from the patch-on-image to yield a first 2D effective region on the first test image. Sixth, perform a noise-removal operation for removing spurious regions around any corner of the first 2D effective region to yield a second 2D effective region. Seventh, perform a central-region merging operation on the second 2D effective region to yield a third 2D effective region for eliminating false boundaries by merging adjacent regions of the second 2D effective region near a center thereof. Eighth, acquire a second plurality of 3D-point data that model the patch-for-training. Ninth, form a third plurality of 3D-point data that model the ground-truth effective region from the second plurality of 3D-point data and the third 2D effective region such that the ground-truth effective region for the patch-for-training is determined.

Preferably, the preparing of the training dataset further comprises determining whether or not the patch-for-training is usable in training by checking: whether the patch-on-image has an insufficient contrast; whether there is an abnormal distribution of brightness over the first or second test image; whether the determined ground-truth effective region has an abnormal geometric center of the ground-truth effective region; and whether one or more holes larger than a predetermined size are present in the determined ground-truth effective region.

A second aspect of the present invention is to provide a computer-implemented method for performing defect detection for one or more samples of an object.

The method comprises planning an inspection path on an inspection surface of the object, the inspection path being used for guiding a movable camera to travel along for optically inspecting the inspection surface for defect detection, wherein the inspection path is planned according to any of the embodiments of the planning method as disclosed herein; processing the one or more object samples for defect detection, wherein the inspection path is used by the camera in optically inspecting the one or more object samples; and in processing an individual object sample for defect detection, controlling the camera to travel along the inspection path and to capture a first image of FOV associated with an individual survived viewpoint upon the camera being located over the individual survived viewpoint on the individual object sample, whereby the captured first image is processed for detecting any possible defect on the individual object sample.

Other aspects of the present invention are disclosed as illustrated by the embodiments hereinafter.

Skilled artisans will appreciate that elements in the figures are illustrated for simplicity and clarity and have not necessarily been depicted to scale.

DETAILED DESCRIPTION

Unless otherwise stated, "an object" as used herein is an article intended to be inspected to determine whether any possible defect is present on the object. In one example, the object is a rail track and the defect is a crack on the track. In another example, the object is a car door and the defect is discoloration on some outer regions of the car door.

An object has an outer surface. It is used herein that "an inspection surface" of the object is an area on the outer surface where the area is intended to be inspected for identifying any possible defect. Depending on practical situations, the inspection surface may be the entire outer surface of the object, or may only be a part of the outer surface. Note that the inspection surface is in the 3D space, and may be curved in the 3D space.

As used herein, "a sample of the object" or "an object sample" is an article manufactured by using the object as a design model in manufacturing the object sample. In other words, the object may be treated as a design prototype and the object sample is a manufactured article of the object. Usually, a large number of object samples are manufactured in practice.

As used herein, "a viewpoint" or "a camera viewpoint" is a location on the inspection surface for the camera to visit for optically inspecting the inspection surface, where the camera visits the viewpoint in a sense that the camera is located over the viewpoint by a certain predetermined non-zero distance from the viewpoint such that the camera is capable of taking an image of the viewpoint and its vicinity on the inspection surface. The image has a FOV, which is the extent of a view that is captured on the image by the camera.

The viewpoint is associated with "a patch," which is used herein as a largest area of the inspection surface within the FOV of the camera when the camera is located over the viewpoint for capturing the image of the FOV. Without reference to the associated viewpoint, the patch may be identified from the image, and is a largest area of the inspection surface within the FOV of the camera. Note that the patch is a surface in the 3D space, and may be curved in the 3D space. As used herein, "a patch-on-image" in connection with the patch is a 2D portion of the image where the 2D image portion corresponds to the patch.

A first aspect of the present invention is to disclose a method for planning an inspection path on an inspection surface of an object, where the inspection path is used for guiding a movable camera to travel along for optically inspecting the inspection surface for defect detection. A goal of the disclosed method is that the entire inspection surface is covered for optical inspection by the camera while avoiding the camera to visit disadvantageous positions that yield invalid captured images not useful for defect detection.

Figure 1:
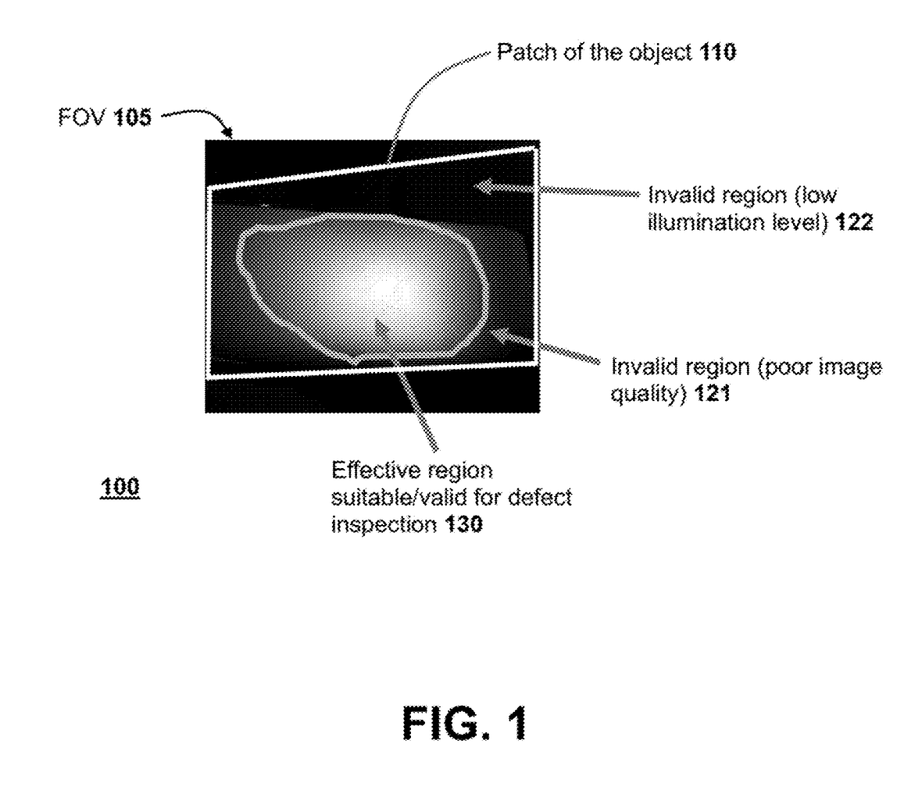
FIG. 1 depicts a typical image of a part of inspection area of an object as captured by a camera for optical inspection.

Before the disclosed method is detailed, it is instructive to show a typical image as captured by the camera for defect detection. FIG. 1 depicts a typical image 100 of (a part of) the inspection area of the object as captured by the camera. The image 100 has a FOV 105. The object under optical inspection, or the inspection area, is most often larger than the FOV 105. A patch 110, which is a portion of the inspection area within the FOV and is viewable to the camera, is identified. In the art, it is often assumed that the whole non-occluded surface of the patch 110 as captured inside the FOV 105 is valid for defect inspection purposes. However, this assumption is not always correct. First, the quality of the image 100 may not be sufficiently high over the entire FOV 105 to reveal sufficiently clear details for the purpose of optical inspection and defect detection. Specifically, the poor image quality on some regions is usually due to blurring on these regions or because these regions are out-of-focus due to problems or imperfection on the camera. Perhaps only one particular region (usually the center) is valid for inspection, while other regions, though captured, are not suitable for inspection purposes. This shortcoming may arise, for example, if the lens of the camera is not designed to provide sufficient sharpness around the periphery of the image 100. A first invalid region 121 not suitable for optical inspection is identified on the image 100 due to poor image quality. Second, one or more parts of the patch 110 on the image 100 may be underexposed or overexposed. In one example, if the patch 110 is shiny (i.e. highly reflective with specular reflection), a certain portion of the patch 110 may become overexposed on the image 100. In another example, the patch 110 is not sufficiently-uniformly illuminated such that only a portion (usually the central part) of the image 100 is suitable for optical inspection whereas the outer region is not. A second invalid region 122 not suitable for optical inspection is identified on the image 100. The remaining area of the patch 110 outside the first and second invalid regions 121, 122 is referred to as an effective region 130, which is suitable, or valid, for defect detection. The disclosed method involves identification of effective regions on different captured images.

The disclosed method is illustrated as follows with the aid of FIG. 2, which depicts a flowchart showing exemplary steps taken in a process 200 of planning an inspection path on an inspection surface of an object in accordance with certain embodiments of the present invention. The inspection path is used for guiding a movable camera to travel along for optically inspecting the inspection surface for defect detection.

Figure 3:
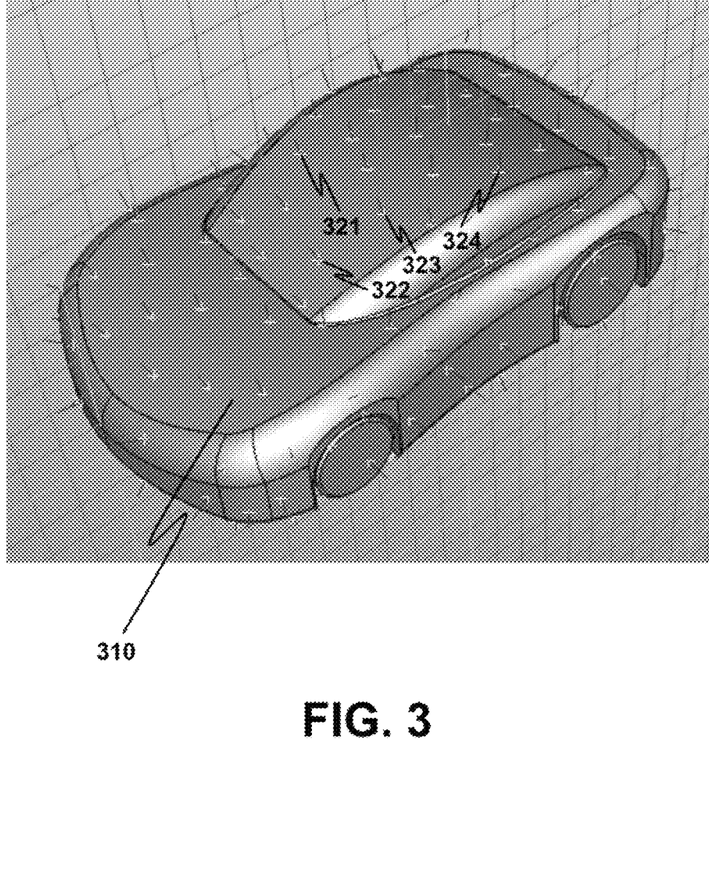
FIG. 3 provides a pictorial description illustrating a plurality of viewpoints generated on an example object, where the generation of the plurality of viewpoints is involved in the planning process.
Figure 4:
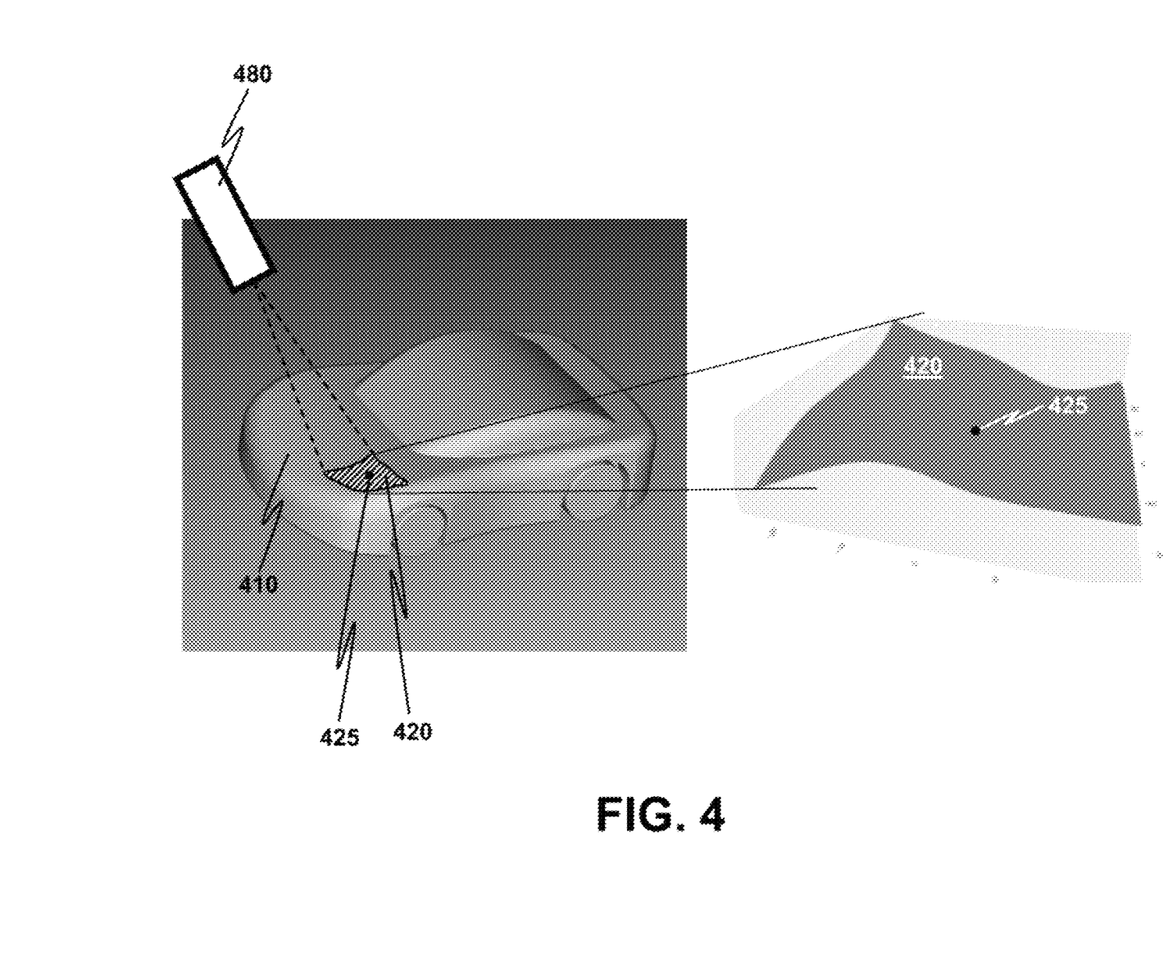
FIG. 4 provides an example of generating a patch by positioning a camera over a certain viewpoint and directing the camera to focus on the viewpoint to capture an image for defect detection, whereby the patch is identified in the image.

If a 3D geometric characterization (i.e. a 3D geometric model, or 3D design data) of the inspection surface of the object is available, the planning process 200 may start with step 240. In the step 240, a set of viewpoints on the inspection surface is generated. An individual viewpoint is associated with a patch. The patch is the largest area of the inspection surface within a FOV of the camera when the camera is located over the individual viewpoint for capturing an image of the FOV. For illustration, FIG. 3 provides a pictorial description of generating a plurality of viewpoints (e.g., viewpoints 321-324) for an example object 310. As a rule of thumb, a set of 1000 viewpoints may be used to cover the whole inspection surface in most practical cases. A higher number of viewpoints may be included in the set if the inspection surface is occupied with a higher number of curved regions. FIG. 4 provides an example of a patch 420 generated by positioning a camera 480 over a viewpoint 425 (located on an inspection surface 410) and directing the camera 480 to focus on the viewpoint 425 in capturing an image for defect detection such that the patch 420 (being a part of the inspection surface 410) is identified in the image.

Locations of different viewpoints for preparing the set of viewpoints may be randomly generated over the whole inspection surface. Alternatively, the locations may be generated according to other viewpoint sampling techniques such as the ones mentioned by E. GLORIEUXA, P. FRANCIOSA and D. CEGLAREK as disclosed above.

Figure 5:
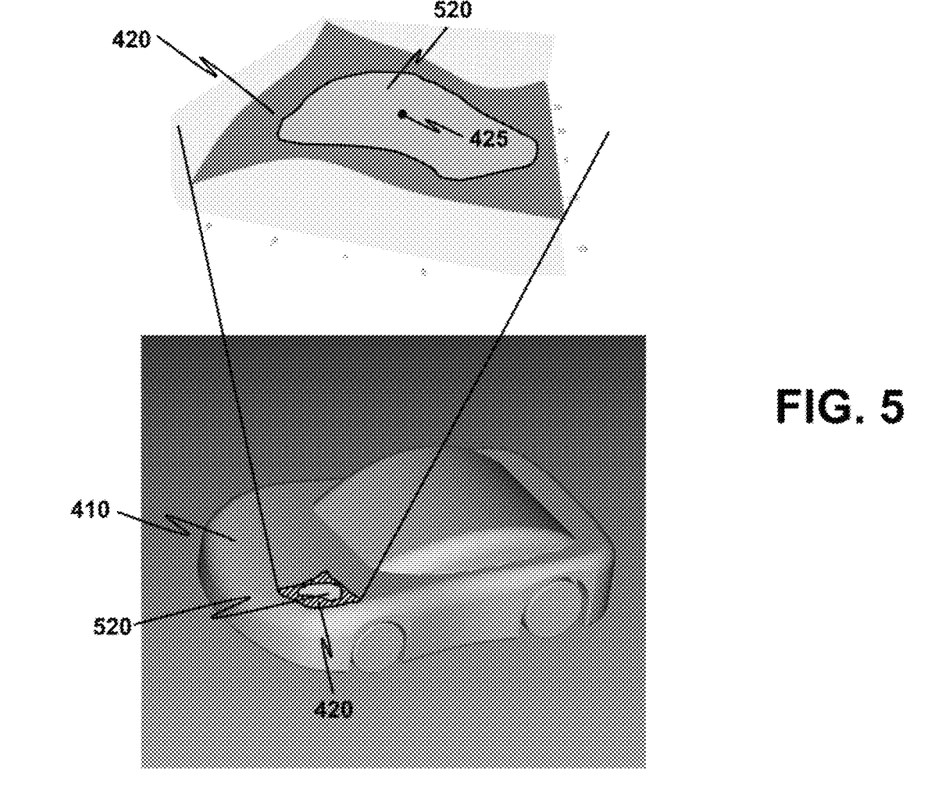
FIG. 5 depicts an illustrative example of an effective region determined for the patch of FIG. 4, where the effective region of the patch is suitable, or valid, for defect detection.

After the plurality of viewpoints are generated in the step 240, an effective region of the patch (associated with the individual viewpoint) is predicted by a NN in step 250 after the NN is trained. In particular, the effective region is predicted by the NN according to a 3D geometric characterization of the patch such that the predicted effective region is valid for defect detection based on the captured image associated with the individual viewpoint. As discussed above, an area on the patch being valid for defect detection is one whose corresponding area on the captured image (1) is not blurred and (2) is neither underexposed nor overexposed. Note that as the effective region is a part of the patch, the effective region is a surface in the 3D space, and may be curved in the 3D space. For illustration, FIG. 5 depicts an example of an effective region 520 determined for the patch 420 of FIG. 4. The effective region 520 is a curved one. Although the viewpoint 425 is located inside the effective region 520 in FIG. 5, it is not always the case. It is possible that a viewpoint may be located outside its corresponding effective region, although this effective region is still associated with the aforesaid viewpoint. After the plurality of viewpoints are processed by the NN, a plurality of respective effective regions associated with the set of viewpoints is obtained. The inspection path can then be determined according to the plurality of respective effective regions, e.g., by steps 260 and 270.

Preferably, the NN is a DNN. As used herein, "a DNN" is a multilayer NN with at least one hidden layer. Deep learning enables more accurate prediction of the effective region.

At present, most commonly-available NNs (including DNNs) for processing a curved surface, such as PointNet++ and ConvPoint, accept a point cloud that models the curved surface as an input to these NNs. In the step 250, preferably the 3D geometric characterization of the patch is given by a plurality of 3D-point data, where the plurality of 3D-point data comprises 3D coordinates of constituent points of a point cloud that models the patch.

If the patch is modeled by the point cloud, it is a preferable option that the step 250 comprises determining whether an individual constituent point of the patch is inside or outside the effective region. By this option, the NN is trained to do a binary segmentation for each constituent point. Furthermore, it allows the effective region to be represented by the point cloud that models the patch with an indication for the individual constituent point whether the individual constituent point is inside or outside the effective region. Note that the NN may be configured to input the point cloud and output a map that indicates whether the individual constituent point is inside or outside the effective region for all the constituent points in the point cloud.

In practical implementations of the planning process 200, the NN may be selected from PointNet++ and ConvPoint. Alternatively, the NN may be generated by an AutoML tool at a start-up stage.

After the plurality of respective effective regions associated with the set of viewpoints is obtained in the step 250, the set of viewpoints is minimized while keeping the entire inspection area to be covered for the optical inspection conducted by the camera. Some of the viewpoints in the set are discarded and some are retained in the minimization process. A retained viewpoint is referred to as a survived viewpoint. In the step 260, specifically, an optimized subset in the set of viewpoints is determined, where the optimized subset forms a set of survived viewpoints such that the determined optimized subset is a smallest non-empty subset in the set of viewpoints under a constraint that a union of respective effective regions of patches associated with different survived viewpoints in the optimized subset covers the entire inspection area. Regarding the constraint, since the effective region is a surface in the 3D space, "a union" of plural surfaces in the 3D space is obtained by combining all the surfaces to form a single surface object in the 3D space such that (1) a first point on any of the surfaces is present on the single surface object, and (2) a second point on the single surface object is present on one or more of the surfaces. This formation of the union of surfaces is similar to a union operation under the set theory. As used herein, "a smallest non-empty subset" in a set of elements under a certain constraint is a non-empty subset having the least number of elements among all possible non-empty subsets each of which is derived from the set of elements and satisfies the aforesaid certain constraint. In the step 260, the optimized subset may be determined according to a solution to the Set Cover Problem as known in the area of combinatorial optimization.

Based on the determined set of viewpoints, the inspection path is determined in the step 270 as an optimized path joining all respective survived viewpoints and visiting each of the respective survived viewpoints once with a minimal travel cost for the camera to travel among all possible paths each of which joins all the respective survived viewpoints and visits each of the respective survived viewpoints once.

The travel cost may be the total distance of the inspection path, or may be the total time required by the camera in traveling from one end of the inspection path to another end. Other choices of the travel cost as deemed appropriate by those skilled in the art are possible. If the travel cost is the total distance of the inspection path, the optimized path is the shortest path among all possible paths linking all the respective survived viewpoints. In the step 270, the optimized path may be determined according to a solution to the Open Loop Travelling Salesman Problem as known in the area of combinatorial optimization.

In certain embodiments, the planning process 200 further comprises a step 230 of obtaining a CAD model of the object before the step 240 of generating the set of viewpoints. The CAD model comprises at least design data that geometrically model the inspection surface. The set of viewpoints can then be generated in the step 240 according to the CAD model.

The CAD model may be selected to be a geometric model that can be conveniently used by a designer in designing the object. For instance, the geometric model may be a polygon mesh, which is a collection of vertices, edges and faces defining the outer surface of the object. While the CAD model is usually selected for making industrial designs convenient, the 3D geometric characterization of the patch as required by the NN in the step 250, such as the point-cloud model of the patch, is often not directly compatible with the CAD model. Hence, conversion of the CAD model to the aforementioned 3D geometric characterization is additionally required in the execution of the step 250.

After the effective region of the patch is predicted in the step 250, the 3D model that represents the effective region, e.g., the map as mentioned above, is not directly compatible with the CAD model. In certain embodiments, the planning process 200 further comprises a step 280 of projecting the effective region associated with an individual survived viewpoint onto the CAD model after the effective region is predicted in the step 250 and the set of survived viewpoints is determined in the step 260. Specifically, the plurality of respective effective regions associated with the set of survived viewpoints is projected onto the CAD model. The CAD model is thereby enriched with the additional information of the set of survived viewpoints as well as the plurality of respective effective regions associated with the set of survived viewpoints. The additional information may be subsequently used for any appropriate purpose. In particular, with the information on the effective region, searching for any possible defect of the object based on the captured image is confined to the effective region rather than the entire patch.

In the step 250, a pre-requisite of the NN is that the NN is a trained one. The NN may be trained by simply loading pre-calculated NN model weights into the NN if the weights are available. Alternatively, the NN may be set in a training phase and the NN is trained with training samples.

In certain embodiments, the planning process 200 further comprises a step 220 of training the NN with a training dataset. The training dataset comprises a plurality of training samples. Practically, the NN may be trained with the plurality of training samples derived from real-life objects.

In a first arrangement, which is preferable, the real-life objects for training encompass a wide range of surface optical properties, such as surface reflectivity, degree of diffusion in reflected light, and object transparency. Thereby, the NN is trained such that the impact of different surface optical properties to prediction of the effective region is reduced. It allows the NN to predict the effective region in the step 250 according to the 3D geometric characterization of the patch without a need to input a surface optical characterization thereof. Once the NN is trained, the NN can be applied to any new objects for testing (with different shapes, different degrees of reflectivity, etc.).

In a second arrangement, the real-life objects for training are same as the object for testing in surface optical property. It causes a surface property of the object for testing to be taken into account in predicting the effective region. Similarly, the surface optical characterization of the object needs not be inputted to the NN in making the prediction. Also similarly, once the NN is trained, the NN can be applied to any new objects for testing. It is believed that a number of training samples required for the second arrangement is less than that required for the first arrangement under the same prediction accuracy achieved by the NN after training.

In both arrangements, a procedure for deriving the plurality of training samples is required. In certain embodiments, the planning process 200 further comprises a step 210 of preparing the training dataset. An individual training sample in the training dataset comprises a patch-for-training and a ground-truth effective region. The patch-for-training is a patch used for training the NN. The ground-truth effective region is an effective region of the patch-for-training.

Figure 6:
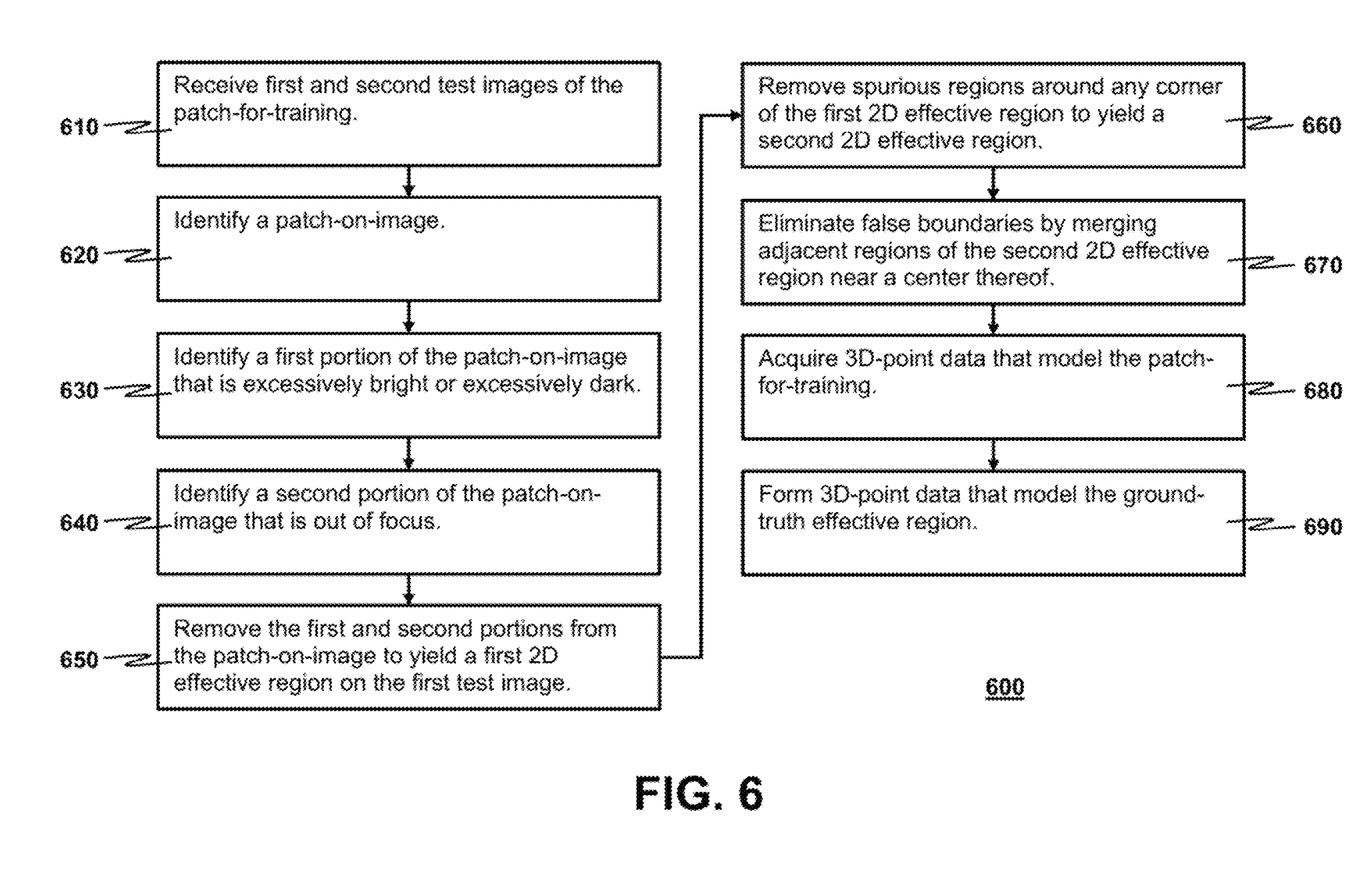
FIG. 6 depicts a flowchart showing an exemplary basic process taken in preparing a training dataset for training a NN used in the planning process, where the basic process is used in generating a training sample by generating a ground-truth effective region for a patch-for-training.

In certain embodiments, the patch-for-training is modeled by a point cloud. Thereby, the training dataset is developed for the specific case that the NN accepts point clouds as inputs. The step 210 includes a basic process for generating the ground-truth effective region for the patch-for-training. FIG. 6 depicts an exemplary basic process 600 used in preparing the training dataset for the aforementioned specific case.

In step 610, first and second test images of the patch-for-training are received or acquired. The two images are images captured by the camera. In particular, the first and second test images are captured by the camera located at the same position over the patch-for-training under a white illumination condition and under a bright/dark strip illumination condition, respectively, in illuminating the patch-for-training.

The white illumination condition is a first illumination condition of illuminating the patch-for-training with plain white light having a preselected color temperature. The white illumination condition provides uniform illumination to the patch-for-training for revealing details thereof.

Figure 7:
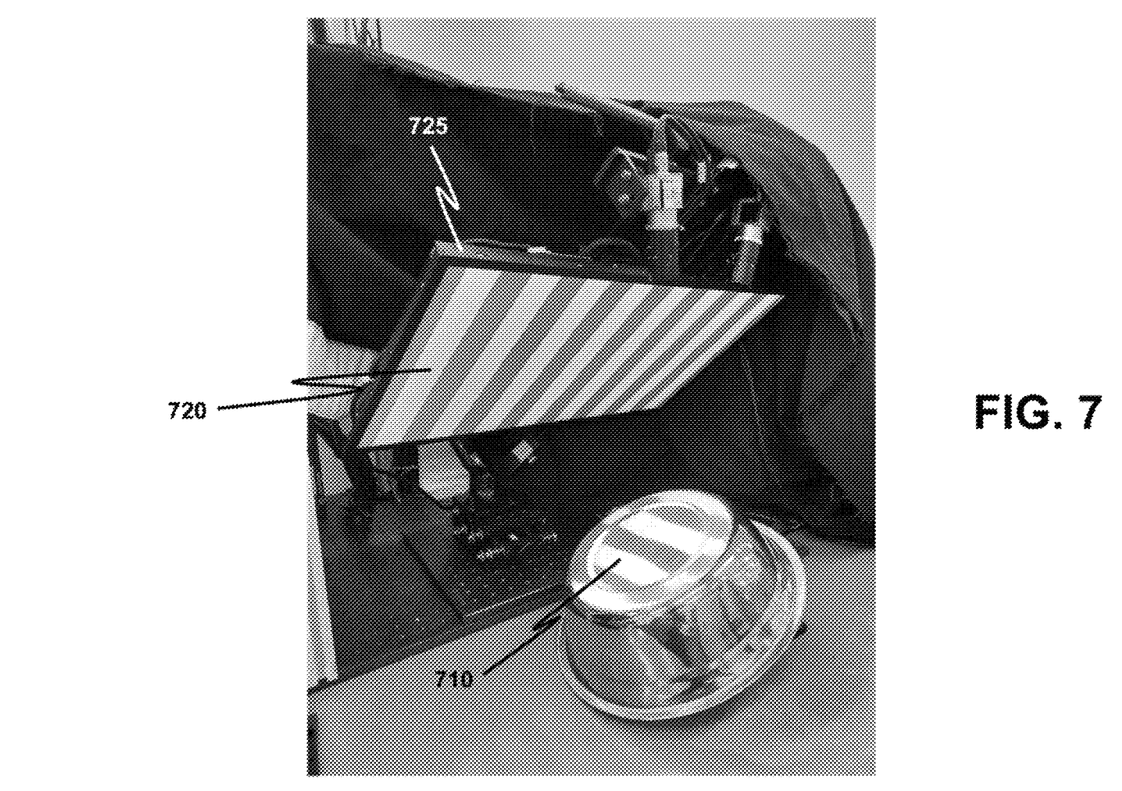
FIG. 7 depicts an example of projecting a bright/dark strip light pattern onto a real-life object when the camera captures an image used in preparing the training dataset.

The bright/dark strip illumination condition is a second illumination condition of projecting a light pattern composed of bright strips interlaced with dark strips to the patch-for-training. For illustration, FIG. 7 depicts an example of a display 725 projecting a bright/dark strip light pattern 720 onto a real-life object 710. The bright/dark strip illumination condition introduces contrast onto the patch-for-training captured on the second test image. The introduced contrast facilitates identifying a certain part of the patch-for-training that is blurred (out of focus) on the second test image.

In executing the step 610, the optics/hardware of the camera is configured to work in a normal operation mode same as the one used in testing the object for defect detection.

In step 620, a patch-on-image on the first test image is identified, where the patch-on-image is the patch-for-training appeared on the first test image. Those skilled in the art will appreciate that an image segmentation technique may be used to identify the patch-on-image against a background on the first test image.

In step 630, a first portion of the patch-on-image that is excessively bright or excessively dark is identified according to the first test image. The first portion may be identified by pixel-by-pixel comparing the patch-on-image on the first test image against a predetermined maximum allowable gray-level threshold value and a predetermined minimum allowable gray-level threshold value. As mentioned above, overexposure or underexposure leads to poor image quality, and an image region that is overexposed or underexposed is not suitable for optical inspection. It is desirable to discard the first portion from the patch-on-image.

In step 640, a second portion of the patch-on-image that is out of focus is identified according to the second test image. Since images of the patch-for-training on the first and second test images are the same, it follows that the first and second test images can be aligned based on the last-mentioned images. Mapping of the patch-for-training between the first and second test images is possible. The second test image has a corresponding patch-on-image. Based on the second test image, an out-of-focus region of the corresponding patch-on-image is identified. Being out of focus is identifiable under the bright/dark strip illumination condition. The out-of-focus region on the second test image is then mapped to the second portion of the patch-on-image on the first test image. It is desirable to discard the second portion from the patch-on-image.

In step 650, the first and second portions are removed from the patch-on-image to yield a first 2D effective region on the first test image. The first 2D effective region is subsequently processed for generating the ground-truth effective region for the patch-for-training.

It is advantageous to remove outliers from the first 2D effective region. In step 660, a noise-removal operation for removing spurious regions around any corner of the first 2D effective region is performed to yield a second 2D effective region on the first test image.

It is possible that the second 2D effective region is fragmented after various image processing operations are performed. It is advantageous to merge nearby islands of the second 2D effective region together such that the ground-truth effective region is not overly segmented. In step 670, a central-region merging operation on the second 2D effective image is performed. This operation eliminates false boundaries by merging adjacent regions of the second 2D effective region near a center thereof. As a result of this operation, a third 2D effective region on the first test image is obtained.

In preparing the training dataset, the third 2D effective region is considered to be a projection of the ground-truth effective region on the first test image. Note that the third 2D effective region is still a planar object. It is required to map the third 2D effective region to the ground-truth effective region in the 3D space. In step 680, a second plurality of 3D-point data that model the patch-for-training is first acquired. In step 690, a third plurality of 3D-point data that model the ground-truth effective region is formed from the second plurality of 3D-point data and the third 2D effective region. Thereby, the ground-truth effective region for the patch-for-training is obtained.

It is not always possible to identify a corresponding ground-truth effective region from any sample of the patch-for-training due to inherent problems in the sample. The corresponding ground-truth effective region may not exist. In this regard, the basic process 600 may be stopped and human attention may be required if an inherent problem of the patch-for-training is identified.

In certain embodiments, the step 210 of preparing the training dataset further includes determining whether or not the patch-for-training is usable in training by checking: whether the patch-on-image has an insufficient contrast; whether there is an abnormal distribution of brightness over the first or second test image; whether there is an abnormal geometric center of the ground-truth effective region determined in the basic process 600; and whether there are one or more holes larger than a predetermined size in the determined ground-truth effective region. In the presence of low contrast over a whole image even under the bright/dark strip illumination condition, defect inspection cannot be done properly. It suggests that there is a serious optics/hardware problem. Human attention is thus required. In the presence of abnormal distribution of brightness over an image under consideration (i.e. the first or second test image), it also implies the occurrence of a serious optics/hardware problem such that a large portion of top/bottom/left/right part of the image under consideration is completely black or completely white. Human attention is also required. In the presence of abnormal geometric center of the ground-truth effective region, the geometric center is far away from the center of the first or second test image. It suggests that the optics/hardware setup is not aligned properly. In the presence of one or more holes larger than a certain size is found inside the ground-truth effective region, human attention is required.

Figure 2:
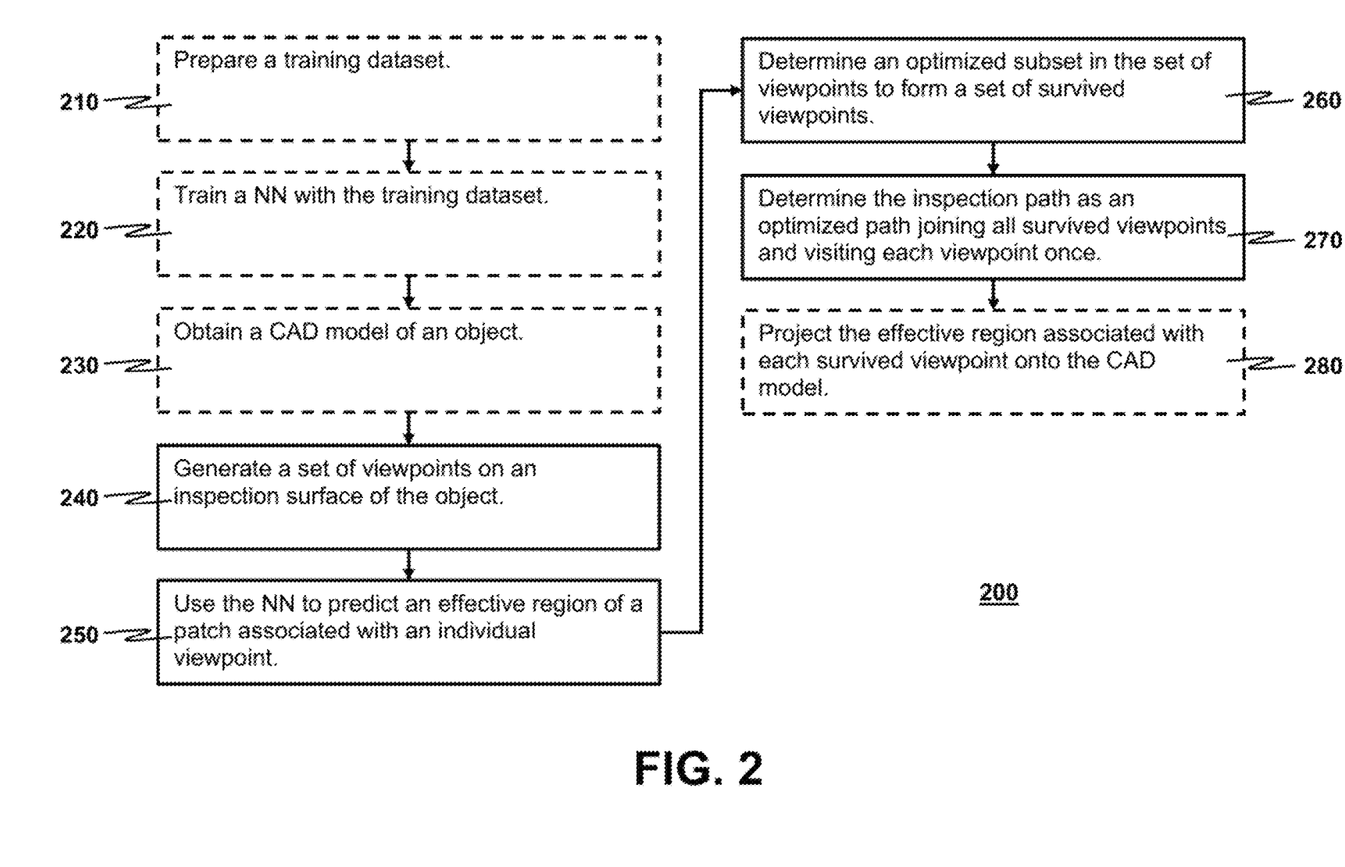
FIG. 2 depicts a flowchart showing exemplary steps taken in a planning process for illustrating a method as disclosed herein for planning an inspection path on an inspection surface of an object.

Although FIG. 2 depicts a specific case for illustration that the planning process 200 is executed in a sequential order of the steps 210, 220, 230, 240, 250, 260, 270 and 280, those skilled in the art will appreciate that the order of some of these steps may be modified without changing the overall outcome of the planning process 200. For instance, the step 230 may precede the step 220.

Similarly, FIG. 6 depicts a specific case for illustration that the basic process 600 is executed in a sequential order of the steps 610, 620, 630, 640, 650, 660, 670, 680 and 690. Despite this, those skilled in the art will appreciate that the order of some of these steps may be modified without changing the overall outcome of the basic process 600. For instance, the step 680 may precede the step 610.

The planning process 200 may be performed or executed by one or more computing processors, or by one or more computers or computing servers. The disclosed method for planning the inspection path may be a computer-implemented method.

As a remark, the disclosed method has the following advantages.

First, planning the inspection path based on the effective-region approach avoids occurrence of invalid inspection processes.

Second, the inspection surface is completely covered.

Third, once the NN is trained, the trained NN can be applied to any new object. To inspect a new object, it is not necessary to reconfigure the optics/hardware of the camera or prepare training data to train the NN again. The trained NN already used for planning one inspection path for one object can be directly reused to plan another inspection path for the new object.

Fourth, the disclosed method is fast to plan the inspection path.

A second aspect of the present invention is to disclose a method for performing defect detection for one or more samples of an object. In defect detection, a movable camera is guided to travel along an inspection path on an inspection surface of an individual object sample so as to optically inspect the inspection surface to detect possible defect(s). The planning process 200 is applicable to planning the inspection path.

Figure 8:
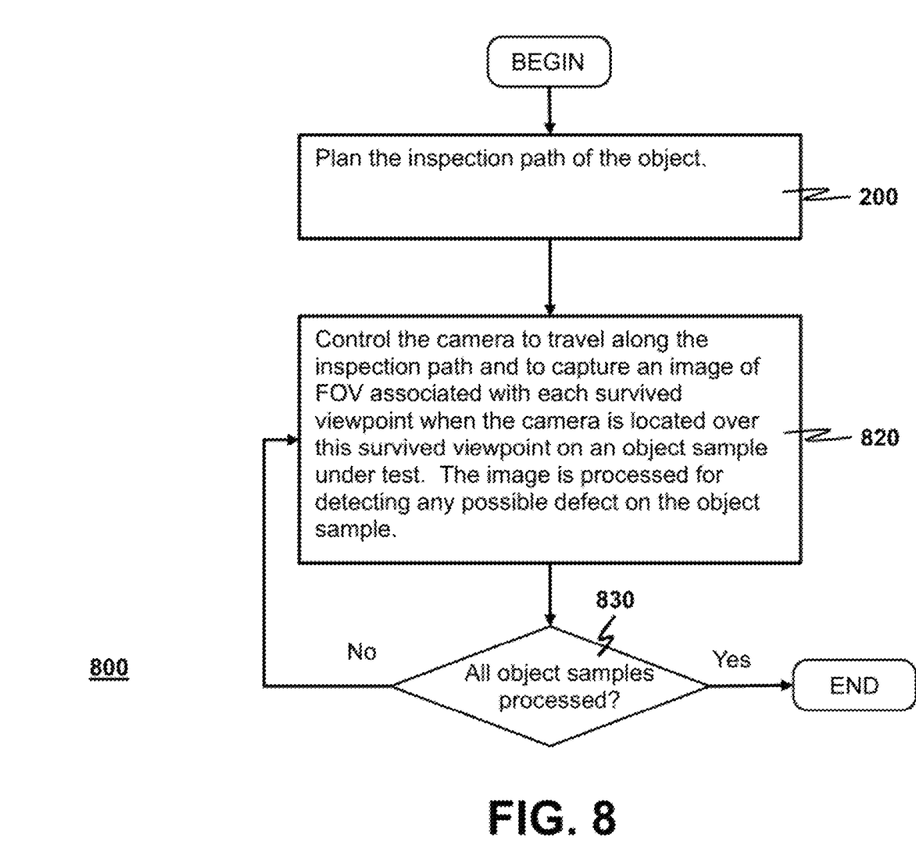
FIG. 8 depicts a flowchart showing an exemplary defect-detecting process for illustrating a method as disclosed herein for performing defect detection for one or more samples of an object, where the defect-detecting process uses the planning process to plan the inspection path for use in optical inspection of the one or more object samples.

The disclosed method is illustrated with the aid of FIG. 8, which depicts a flowchart showing an exemplary defect-detecting process 800 for testing the one or more object samples for defect detection.

The defect-detecting process 800 employs any embodiment of the planning process 200 as disclosed above to plan the inspection path. The one or more object samples are then processed for defect detection. The planned inspection path is used by the camera in optically inspecting each of the one or more object samples.

In processing an individual object sample for defect detection (step 820), the camera is controlled to travel along the inspection path and to capture an image of FOV associated with an individual survived viewpoint (selected from the set of survived viewpoints as determined in the planning process 200) when the camera is located over the individual survived viewpoint on the individual object sample. The aforesaid captured image is then processed for detecting any possible defect on the individual object sample.

The step 820 is repeated until all the one or more object samples are processed (step 830).

The defect-detecting process 800 may be performed or executed by one or more computing processors, or by one or more computers or computing servers. The disclosed method for performing defect detection for the one or more object samples may be a computer-implemented method.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for planning an inspection path on an inspection surface of an object, the inspection path being used for guiding a movable camera to travel along for optically inspecting the inspection surface for defect detection, the method comprising:

generating a set of viewpoints on the inspection surface, an individual viewpoint being associated with a patch, the patch being a largest area of the inspection surface within a field of view (FOV) of the camera when the camera is located over the individual viewpoint for capturing an image of the FOV;

predicting an effective region of the patch by a neural network (NN) according to a three-dimensional (3D) geometric characterization of the patch such that the predicted effective region is valid for defect detection based on the captured image associated with the individual viewpoint, wherein the NN predicts the effective region after the NN is trained; and determining the inspection path according to a plurality of respective effective regions associated with the set of viewpoints, wherein the determining of the inspection path comprises:

determining an optimized subset in the set of viewpoints to form a set of survived viewpoints such that the determined optimized subset is a smallest non-empty subset in the set of viewpoints under a constraint that a union of respective effective regions of patches associated with different survived viewpoints in the optimized subset covers the entire inspection area; and determining the inspection path as an optimized path joining all respective survived viewpoints and visiting each of the respective survived viewpoints once with a minimal travel cost for the camera to travel among all possible paths each of which joins all the respective survived viewpoints and visits each of the respective survived viewpoints once.

2. The method of claim 1, wherein the 3D geometric characterization is given by a plurality of 3D-point data comprising 3D coordinates of constituent points of a point cloud that models the patch.

3. The method of claim 2, wherein the predicting of the effective region of the patch by the NN comprises:
determining whether an individual constituent point of the patch is inside or outside the effective region, thereby allowing the effective region to be represented by the point cloud that models the patch with an indication for the individual constituent point whether the individual constituent point is inside or outside the effective region.

4. The method of claim 2, wherein the NN is a deep neural network (DNN).

5. The method of claim 2, wherein the NN is selected from PointNet++ and ConvPoint.

6. The method of claim 2 wherein the NN is generated by an automated machine learning (AutoML) tool.

7. The method of claim 2 further comprising:
training the NN with a training dataset.

8. The method of claim 7 wherein the training dataset comprises a plurality of training samples, an individual training sample comprising a patch-for-training and a ground-truth effective region.

9. The method of claim 8 further comprising preparing the training dataset, wherein the preparing of the training dataset comprises:
receiving first and second test images of the patch-for-training, wherein the first and second test images are captured by the camera located at a same position over the patch-for-training under a white illumination condition and under a bright/dark strip illumination condition, respectively, in illuminating the patch-for-training;
identifying a patch-on-image on the first test image, wherein the patch-on-image is the patch-for-training appeared on the first test image;
identifying a first portion of the patch-on-image that is excessively bright or excessively dark according to the first test image;
identifying a second portion of the patch-on-image that is out of focus according to the second test image;
removing the first and second portions from the patch-on-image to yield a first 2D effective region on the first test image;
performing a noise-removal operation for removing spurious regions around any corner of the first 2D effective region to yield a second 2D effective region;
performing a central-region merging operation on the second 2D effective region to yield a third 2D effective region for eliminating false boundaries by merging adjacent regions of the second 2D effective region near a center thereof;
acquiring a second plurality of 3D-point data that model the patch-for-training; and
forming a third plurality of 3D-point data that model the ground-truth effective region from the second plurality of 3D-point data and the third 2D effective region such that the ground-truth effective region for the patch-for-training is determined.

10. The method of claim 9, wherein the preparing of the training dataset further comprises:
determining whether or not the patch-for-training is usable in training by checking:
whether the patch-on-image has an insufficient contrast;
whether there is an abnormal distribution of brightness over the first or second test image;
whether the determined ground-truth effective region has an abnormal geometrie center of the ground-truth effective region; and
whether one or more holes larger than a predetermined size are present in the determined ground-truth effective region.

11. The method of claim 1 further comprising:
obtaining a computer-aided design (CAD) model of the object, the CAD model comprising at least design data that geometrically model the inspection surface, whereby the set of viewpoints is generated according to the CAD model.

12. The method of claim 11 further comprising:
after the effective region is predicted, projecting the effective region associated with an individual survived viewpoint onto the CAD model.

13. The method of claim 1, wherein the optimized subset is determined according to a solution to the Set Cover Problem.

14. The method of claim 1, wherein the optimized path is determined according to a solution to the Open Loop Travelling Salesman Problem.

15. A computer-implemented method for performing defect detection for one or more samples of an object, the method comprising:
planning an inspection path on an inspection surface of the object, the inspection path being used for guiding a movable camera to travel along for optically inspecting the inspection surface for defect detection, wherein the inspection path is planned according to the planning method of claim 1;
processing the one or more object samples for defect detection, wherein the inspection path is used by the camera in optically inspecting the one or more object samples; and
processing an individual object sample for defect detection, controlling the camera to travel along the inspection path and to capture a first image of FOV associated with an individual survived viewpoint upon the camera being located over the individual survived viewpoint on the individual object sample, whereby the captured first image is processed for detecting any possible defect on the individual object sample.

16. A computer-implemented method for planning an inspection path on an inspection surface of an object, the inspection path being used for guiding a movable camera to travel along for optically inspecting the inspection surface for defect detection, the method comprising:
generating a set of viewpoints on the inspection surface, an individual viewpoint being associated with a patch, the patch being a largest area of the inspection surface within a field of view (FOV) of the camera when the camera is located over the individual viewpoint for capturing an image of the FOV;

predicting an effective region of the patch by a neural network (NN) according to a three-dimensional (3D) geometric characterization of the patch such that the predicted effective region is valid for defect detection based on the captured image associated with the individual viewpoint, wherein the 3D geometric characterization is given by a plurality of 3D-point data comprising 3D coordinates of constituent points of a point cloud that models the patch, wherein the NN predicts the effective region after the NN is trained, and wherein the predicting of the effective region of the patch by the NN comprises determining whether an individual constituent point of the patch is inside or outside the effective region to thereby allow the effective region to be represented by the point cloud that models the patch with an indication for the individual constituent point whether the individual constituent point is inside or outside the effective region; and determining the inspection path according to a plurality of respective effective regions associated with the set of viewpoints.

17. A computer-implemented method for planning an inspection path on an inspection surface of an object, the inspection path being used for guiding a movable camera to travel along for optically inspecting the inspection surface for defect detection, the method comprising:

generating a set of viewpoints on the inspection surface, an individual viewpoint being associated with a patch, the patch being a largest area of the inspection surface within a field of view (FOV) of the camera when the camera is located over the individual viewpoint for capturing an image of the FOV;

predicting an effective region of the patch by a neural network (NN) according to a three-dimensional (3D) geometric characterization of the patch such that the predicted effective region is valid for defect detection based on the captured image associated with the individual viewpoint, wherein the 3D geometric characterization is given by a plurality of 3D-point data comprising 3D coordinates of constituent points of a point cloud that models the patch, and wherein the NN predicts the effective region after the NN is trained;

training the NN with a training dataset, wherein the training dataset comprises a plurality of training samples, an individual training sample comprising a patch-for-training and a ground-truth effective region; and determining the inspection path according to a plurality of respective effective regions associated with the set of viewpoints.

18. The method of claim 17 further comprising preparing the training dataset, wherein the preparing of the training dataset comprises:

receiving first and second test images of the patch-for-training, wherein the first and second test images are captured by the camera located at a same position over the patch-for-training under a white illumination condition and under a bright/dark strip illumination condition, respectively, in illuminating the patch-for-training;

identifying a patch-on-image on the first test image, wherein the patch-on-image is the patch-for-training appeared on the first test image;

identifying a first portion of the patch-on-image that is excessively bright or excessively dark according to the first test image;

identifying a second portion of the patch-on-image that is out of focus according to the second test image;

removing the first and second portions from the patch-on-image to yield a first 2D effective region on the first test image;

performing a noise-removal operation for removing spurious regions around any corner of the first 2D effective region to yield a second 2D effective region;

performing a central-region merging operation on the second 2D effective region to yield a third 2D effective region for eliminating false boundaries by merging adjacent regions of the second 2D effective region near a center thereof;

acquiring a second plurality of 3D-point data that model the patch-for-training; and forming a third plurality of 3D-point data that model the ground-truth effective region from the second plurality of 3D-point data and the third 2D effective region such that the ground-truth effective region for the patch-for-training is determined.

19. The method of claim 18, wherein the preparing of the training dataset further comprises:

determining whether or not the patch-for-training is usable in training by checking:

whether the patch-on-image has an insufficient contrast;

whether there is an abnormal distribution of brightness over the first or second test image;

whether the determined ground-truth effective region has an abnormal geometric center of the ground-truth effective region; and whether one or more holes larger than a predetermined size are present in the determined ground-truth effective region.

* * * * *